United States Patent [19]

Comer

[11] Patent Number: 5,207,168
[45] Date of Patent: May 4, 1993

[54] METHOD AND APPARATUS FOR TREATING TURF

[75] Inventor: Robert C. Comer, Hopkins, Minn.

[73] Assignee: The Toro Company, Minneapolis, Minn.

[21] Appl. No.: 930,974

[22] Filed: Aug. 17, 1992

Related U.S. Application Data

[60] Continuation of Ser. No. 806,657, Dec. 13, 1991, abandoned, which is a division of Ser. No. 434,758, Nov. 13, 1989, Pat. No. 5,119,744.

[51] Int. Cl.$^5$ .............................................. A01B 45/00
[52] U.S. Cl. .................................... 111/200; 111/127; 172/21
[58] Field of Search ................... 111/200, 127; 47/485, 47/DIG. 10; 172/27

[56] References Cited

U.S. PATENT DOCUMENTS

| | | | |
|---|---|---|---|
| Re. 25,307 | 12/1962 | Johnston | 111/6 |
| 2,930,334 | 3/1960 | Marron et al. | 111/127 |
| 2,988,025 | 6/1961 | Johnston | 111/127 |
| 3,012,526 | 12/1961 | Baldwin et al. | 111/127 |
| 3,029,756 | 4/1962 | Krivda | 111/6 |
| 3,136,274 | 6/1964 | Townsend | 111/6 |
| 3,252,249 | 5/1966 | Propst | 47/1.43 |
| 3,295,480 | 1/1967 | Haynes | 111/6 |
| 3,361,354 | 1/1968 | Johnston | 239/11 |
| 3,361,357 | 1/1968 | Johnston | 239/127 |
| 3,409,033 | 11/1968 | Johnston | 137/51 |
| 3,435,785 | 4/1969 | Harbolt | 111/6 |
| 3,508,709 | 4/1970 | Small et al. | 239/287 |
| 3,518,953 | 7/1970 | Johnston | 111/7 |
| 3,521,819 | 7/1970 | Johnston | 111/127 |

(List continued on next page.)

FOREIGN PATENT DOCUMENTS

| | | |
|---|---|---|
| 3439380 | 2/1986 | Fed. Rep. of Germany. |
| 328859 | 8/1971 | U.S.S.R. . |
| 341264 | 3/1972 | U.S.S.R. . |
| 660614 | 5/1979 | U.S.S.R. . |

OTHER PUBLICATIONS

Landscape Guide Management, Apr., 1988 article entitled "Warm-Season Insect Control Guide".
Golf Course Management, Nov., 1989 article entitled "High-Pressure Injection for White Grub Control" by Patricia J. Vittum.

Primary Examiner—Dennis L. Taylor
Assistant Examiner—Spencer Warnick
Attorney, Agent, or Firm—Merchant, Gould, Smith, Edell, Welter & Schmidt

[57] ABSTRACT

A method and apparatus for treating turf to reduce the general soil density in which turfgrasses grow and thus promote turf growth and turf drainage which includes injecting through the turf into the soil a pattern of jets of generally incompressible liquid at a jet pressure and jet spacing to provide a lateral dispersion of the liquid within the soil such that the liquid dispersion from adjacent jets coact with one another to lift and fracture the soil. A plurality of small diameter nozzles are mounted on a movable frame generally transverse to the direction of travel of the frame. A pressurized fluid source is mounted on the frame and connected through a control device to the nozzles. The control device control the flow of liquid from the pressure source to the nozzles to produce periodic, relatively small cross-sectional, slugs, or jets, of liquid from the nozzles through the turf into the soil. The pressure on each slug of liquid is such that the liquid penetrates through the turf into the soil and also disperses generally laterally within the soil. The spacing of the nozzles and the speed of travel of the frame are such the lateral dispersion of each slug of liquid coacts with adjacent slugs to lift and fracture the soil, thereby reducing the compaction, or general density, of the soil and promoting turf growth and drainage.

6 Claims, 9 Drawing Sheets

U.S. PATENT DOCUMENTS

| | | | |
|---|---|---|---|
| 3,533,366 | 10/1970 | Francom | 111/7 |
| 3,538,867 | 11/1970 | Every | 111/6 |
| 3,598,323 | 8/1971 | Johnston | 239/533 |
| 3,653,330 | 4/1972 | Williams | 222/136 |
| 3,709,436 | 1/1973 | Foster | 239/287 |
| 3,786,890 | 6/1973 | Barnes | 111/7 |
| 3,815,525 | 6/1974 | Kainson et al. | 111/127 |
| 3,875,876 | 4/1975 | Pustovoit et al. | 111/127 |
| 3,877,643 | 4/1975 | Smith et al. | 239/102 |
| 3,883,075 | 5/1975 | Edney | 239/101 |
| 3,905,552 | 9/1975 | Hall et al. | 239/101 |
| 3,926,131 | 12/1975 | Collins | 111/6 |
| 4,009,666 | 3/1977 | Russell et al. | 111/127 |
| 4,034,686 | 7/1977 | Collins | 111/7 |
| 4,074,858 | 2/1978 | Burns et al. | 239/172 |
| 4,077,569 | 3/1978 | Deines | 239/101 |
| 4,100,610 | 7/1978 | Johnston | 366/102 |
| 4,162,763 | 7/1979 | Higgins | 239/101 |
| 4,182,247 | 1/1980 | Talbott | 111/3 |
| 4,186,671 | 2/1980 | Huang | 111/2 |
| 4,231,283 | 11/1980 | Malburg | 89/8 |
| 4,233,915 | 11/1980 | Kordon | 111/6 |
| 4,267,782 | 5/1981 | Talbott | 111/7.1 |
| 4,270,471 | 6/1981 | Talbott | 111/6 |
| 4,284,243 | 8/1981 | Shaner | 239/469 |
| 4,392,611 | 7/1983 | Bachman et al. | 239/74 |
| 4,429,647 | 2/1984 | Zinck | 111/6 |
| 4,481,894 | 11/1984 | Brenn | 111/6 |
| 4,523,280 | 6/1985 | Bachman | 364/424 |
| 4,570,553 | 2/1986 | Ito | 111/6 |
| 4,624,193 | 11/1986 | Johnston | 111/6 |
| 4,708,058 | 11/1987 | Smith | 101/147 |
| 4,805,088 | 2/1989 | Cross et al. | 364/172 |
| 4,807,544 | 2/1989 | Cross et al. | 111/7 |
| 4,907,516 | 3/1990 | Rogers | 111/127 |
| 4,970,973 | 11/1990 | Lyle et al. | 111/127 |

METHOD AND APPARATUS FOR TREATING TURF

This is a continuation application under 37 CFR 1.62 of prior application Ser. No. 07/806,657, filed on Dec. 13, 1992, which was abandoned upon the fling hereof, which is a divisional of prior application Ser. No. 07/434,758, filed Nov. 13, 1989 and issued on Jun. 9, 1992 as U.S. Pat. No. 5,119,744.

BACKGROUND OF THE INVENTION

I. Field of the Invention

This invention pertains generally to a method and apparatus for treating turf through turf and turf subsoil cultivation and more particularly to a method and apparatus which utilizes the discharge of properly spaced periodic slugs, or jets, of pressurized incompressible liquid injected into the turf and turf subsoil to reduce soil compaction, or general density, of the soil in which the turfgrasses grow.

II. Discussion of the Prior Art

Turfgrasses are utilized for functional, recreational and aesthetic purposes, including, but not limited to, the playing surfaces of turf facilities among them golf courses, parks, sports fields, cemeteries, highways rights of ways and industrial and home lawns. While this specification will discuss turf maintenance specifically with respect to golf course greens, it is to be understood that these maintenance problems exist with all turf facilities.

Intensive use of a turf area and maintenance operations often result in turf wear and soil compaction. This compaction reduces large, or macro, pore space and total pore space in the soil which in turn reduces water infiltration into the soil, percolation through the soil, and drainage out of the soil; limits exchange of soil gases, especially soil oxygen, with the atmosphere; and tends to restrict and reduce root growth and development of turfgrasses, for example, causing, in some cases, substantial reduction of the root system and often death of deeper roots.

The proper cultivation of turf to enhance drainage, and thereby thorough root growth, and improve the soil-air-water relationship has long been a problem within the industry, and a great number of devices have been proposed in the past in an effort to find a solution.

Core cultivation (aerification) is widely utilized as a long-term program to alleviate compacted conditions in the soil root zone. Several different types of core cultivation equipment are available commercially. One such type is the Toro Greensarator. Core cultivation equipment utilize vertically operating hollow or solid metal tines which are forcibly driven into the turf to a depth of 2 ½ to 3 inches extract a plug, or core, of the turf which is then deposited on the turf surface of the green. (In all instances the cores are collected and removed from the green and may dried and used in a mix which is returned to the green to fill the holes).

Research has shown that core cultivation creates a serious problem. Repeatedly forcing the metal tines into the turf to a common depth will, over time, create a compacted subsurface layer of soil, sometimes called plow sole, at a depth about one inch deeper than the length of the tines, in other words at about 3 ½ to 4 inches below the surface of the turf. Further, the metal tines also tend to glaze the soil and create some compaction along the sides of the coring hole. This subsurface compaction creates two major problems with proper turf management. First, the compacted layer interferes with proper water movement within the soil, and second, the compacted layer interferes with proper root growth of the turf grasses. In addition to the compaction problem, core cultivation creates another problem—the removal or utilization of the removed turf cores. Present techniques often leave a golf green unplayable for two to three days after treatment. The present invention provides a method and apparatus which will allow immediate turf and subsoil treatment at the time treatment is needed rather than waiting for a convenient time, and thus allows immediate use of the treated turf.

The present invention is a unique method and apparatus for accomplishing subsoil cultivation which utilizes periodic turf and soil injection of a substantially incompressible liquid, such as water, in pattern, and at sufficient pressure, to lift and fracture the soil to reduce the compaction, or general density, of the treated area. There are numerous prior art disclosures which use incompressible liquids for turf treatment, however, none of these references teach or suggest subsoil cultivation through the use of liquid injection to reduce soil density.

Marron et al, U.S. Pat. No. 2,930,334 discloses an apparatus for injecting liquid compounds such as liquid fertilizers or weed killers into the soil to be treated. Marron U.S. Pat. No. 2,930,334 gives no indication of any jet pressures, nor does Marron suggest liquid injection for the purpose of reducing the general soil density. Indeed, Marron teaches the sequential operation of a series of liquid injection nozzles such that the pattern generated could not create a significant reduction in soil density.

Baldwin et al, U.S. Pat. No. 3,012,526 discloses a method for injecting liquids into soil by imparting, through the application of high pressure, a high velocity to a slug of liquid to cause the unconfined liquid slug to penetrate the soil. More particularly, Baldwin is directed to a method of injecting liquids such as soil fumigants, liquid fertilizers, and insecticides by jet penetration. Nothing in the Baldwin teaches or suggests the pressures or injection spacing necessary to significantly reduce the general density of the treated soil.

Johnston, U.S. Pat. No. 2,988,025, and its Reissue Patent No. Re. 25,307 relate to methods of imparting highly volatile liquids, such as anhydrous ammonia, into soil for the purpose of fertilization or fumigation. Neither of the Johnston references teach or suggest the utilization of pressurized liquid injection to reduce compaction, or in other words, to reduce the general soil density so as to improve drainage and turfgrass growth.

Johnston, U.S. Pat. No. 3,521,819 discloses a hydraulic device for intermittently ejecting slugs of liquid under pressure into the soil. Johnston U.S. Pat. No. 3,521,819 is specifically described as an improved apparatus for carrying out the invention described in Baldwin, U.S. Pat. No. 3,012,526 discussed above. Nowhere does the U.S. Pat. No. 3,521,819 patent, either alone or in combination with the Baldwin reference, suggest a method or apparatus for reducing the general density of the soil in order to improve its drainage and thereby enhance root growth.

Collins, U.S. Pat. No. 3,926,131 and its continuation-in-part U.S. Pat. No. 4,034,686 disclose soil treating equipment which utilize liquid injection tongs, or tines, which are mechanically driven into the soil to be treated. Each of the tongs have a nozzle adjacent its tip so that liquid can be injected into the soil after the tong is buried in the soil. Neither of the Collins references teach or suggest the injection of slugs, or jets, of liquid at a pressure and spacing sufficient to reduce the general density of the treated soil.

Russell et al, U.S. Pat. No. 4,009,666 discloses an apparatus for injecting liquids below the surface of the turf. The U.S. Pat. No. 4,009,666 describes the application of a continuous stream of liquid rather than the application of periodic slugs, or jets, of pressurized liquid. Nothing in the Russell patent teaches or suggests a method or apparatus for reducing the general density of the treated soil.

Johnston, U.S. Pat. No. 4,624,193 is directed to a method and apparatus for the jet injection of liquids into the soil. More particularly, the U.S. Pat. No. 4,624,193 reference pertains to the application of agricultural liquids to plants rather than the treatment of turf. Nothing in the Johnston U.S. Pat. No. 4,624,193 teaches or suggests either the pressures or pattern spacing necessary to accomplish a general reduction in soil density.

SUMMARY OF THE INVENTION

The present invention describes a method and apparatus for improving turf grass management through turf and turf subsoil cultivation to reduce the general density of the treated soil in order to improve its drainage and the growth of grass roots.

The science of turf management and treatment is plagued with a myriad of problems. For example, all grasses do not respond the same to a particular treatment. Indeed, the same grass may respond differently depending upon its location. For example, the same grass, grown in Washington, Illinois, and Florida may show widely different results when subjected to the same treatment. Differences in soil, weather conditions, and a host of other variables will have a significant impact on turfgrass treatment results. Extensive research has established that the subsoil cultivation that results from the present invention produces significant improvement in turf growth over a wide range of varying conditions.

The present invention provides a method for performing subsoil cultivation from a moving apparatus so as to reduce the general density, or compaction, of soil. The method includes a step of periodically injecting, from above the turf to be treated, relatively small cross-sectional spaced jets of generally incompressible liquid through the turf and into the soil. These jets, or slugs, of liquid are at a pressure sufficient to cause a lateral dispersion of the liquid within the soil. In addition, the jet spacing is such that the lateral dispersion from adjacent jets coact with one another to lift and fracture the soil and reduce the general soil density.

While the subsoil cultivation of the present invention provides hydraulic aerification of the turf being treated, it goes beyond mere aerification of the turf and actually cultivates the subsoil by lifting and fracturing the subsurface soil to decrease its density. It is this reduction in soil density that provides the great improvements in turfgrass growth and soil-air-water relationships.

The apparatus included within the present invention includes a frame and a suitable drive mechanism for propelling the frame at a given speed over the turf to be treated. A plurality of fluid nozzles are mounted on the frame, the fluid nozzles being spaced a specified distance from each other and in a direction generally transverse to the direction of travel of the frame. Each of the fluid nozzles has an input and output port. The output port of each nozzle is located a specified distance above the turf. A pump, or other suitable source of pressurized liquid, is also mounted on, or in fluid engagement with, the frame along with a control device which periodically connects the source of pressurized liquid to the input ports of each of the nozzles. The source of pressurized liquid, in conjunction with the control device, periodically creates a pressure at the nozzles sufficient to produce a jet, or slug, of fluid flow from the output port of each nozzle. These slugs of liquid are at a pressure sufficient to cause the liquid to generally vertically penetrate the soil and at the same time create a dispersion pattern of the liquid in a direction generally laterally from the direction of penetration. The distance between each nozzle, and the speed at which the frame is propelled over the turf, is controlled to provide a coaction between the dispersion patterns from each port so that the dispersion patterns of adjacent ports produces subsoil cultivation which lifts and fractures the soil to reduce the general soil density.

It is an object of the present invention to provide a unique method and apparatus for treating turf by reducing the general density of the soil in which the turfgrasses grow in order to promote improved turf growth and improved drainage of the turf.

It is another object of the present invention to provide a unique method and apparatus for treating turf which includes injecting, from above the surface of the turf to be treated relatively small cross-sectional spaced jets of generally incompressible liquid through the turf into the soil.

It is still another object of the present invention to provide a unique method and apparatus for treating turf by reducing the general density of the soil in which the turfgrasses grow in order to promote improved turf growth and improved turf drainage which includes injecting through the turf into the soil a pattern of relatively small cross-sectional jets of a generally incompressible liquid at a jet pressure and at a jet spacing to provide a lateral dispersion of the liquid within the soil such that the liquid dispersion of adjacent jets coact with one another to lift and fracture the soil.

Another object of the present invention is to provide new and improved apparatus for treating turf which includes a frame movable with respect to the turf to be treated and having a plurality of spaced, small diameter, nozzles mounted thereon in a direction generally transverse to the direction of the frame, the nozzles being above, and spaced from, the turf to be treated. Also mounted on the frame is a source of generally incompressible liquid which is connected through a control device to the spaced nozzles to produce periodic, relatively small cross-sectional, slugs or jets of liquid from the nozzles through the turf into the soil at a pressure such that the liquid penetrates the soil and also disperses generally laterally within the soil. The spacing of the nozzles and the speed of the frame are such that the lateral dispersion of each jet of liquid coacts with adjacent jets to lift and fracture the soil thereby reducing the compaction, or general density, of the soil to promote turf growth and drainage.

A further object of the present invention is to provide a method and apparatus for turf treatment which includes injecting jets of generally incompressible liquid from above the surface of the turf to be treated at a system pressure greater than or equal to 2300 psi.

These and other objects and advantages of the present invention will become apparent to those skilled in the art to which the invention pertains from a consideration of the following detailed description of a preferred embodiment of the invention, especially when taken in consideration of the accompanying drawings.

DETAILED DESCRIPTION OF THE PREFERRED EMBODIMENT

Referring to the drawings, wherein like numerals represent like parts throughout the several views, there is generally disclosed at 10 an apparatus for treating turf through subsoil cultivation so as to reduce the soil density. While the apparatus shown in the drawings is a walk behind cultivator, it should be understood that the present invention may be practiced in a power driven rider version or in a trailer mounted version suitable for towing by an independent drive mechanism.

Figure 1:
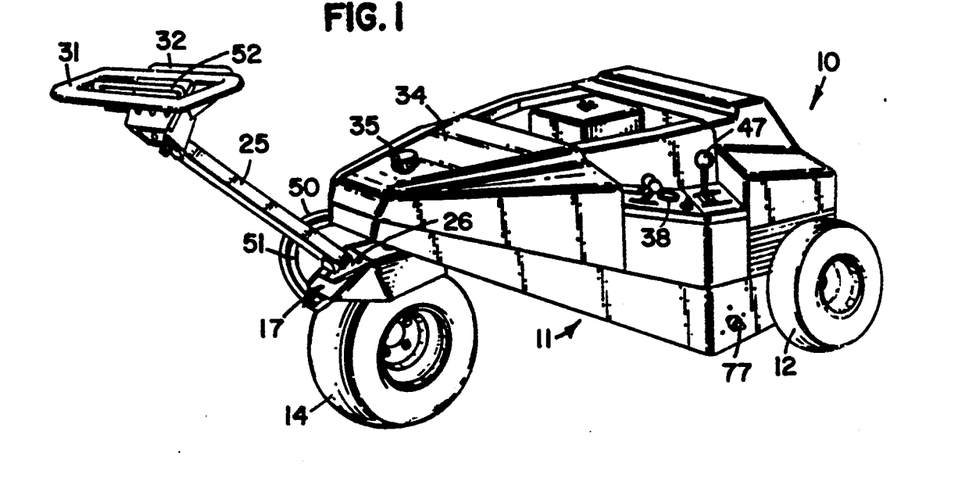
FIG. 1 is a perspective view showing one embodiment of the subsoil cultivator of the present invention.
Figure 2:
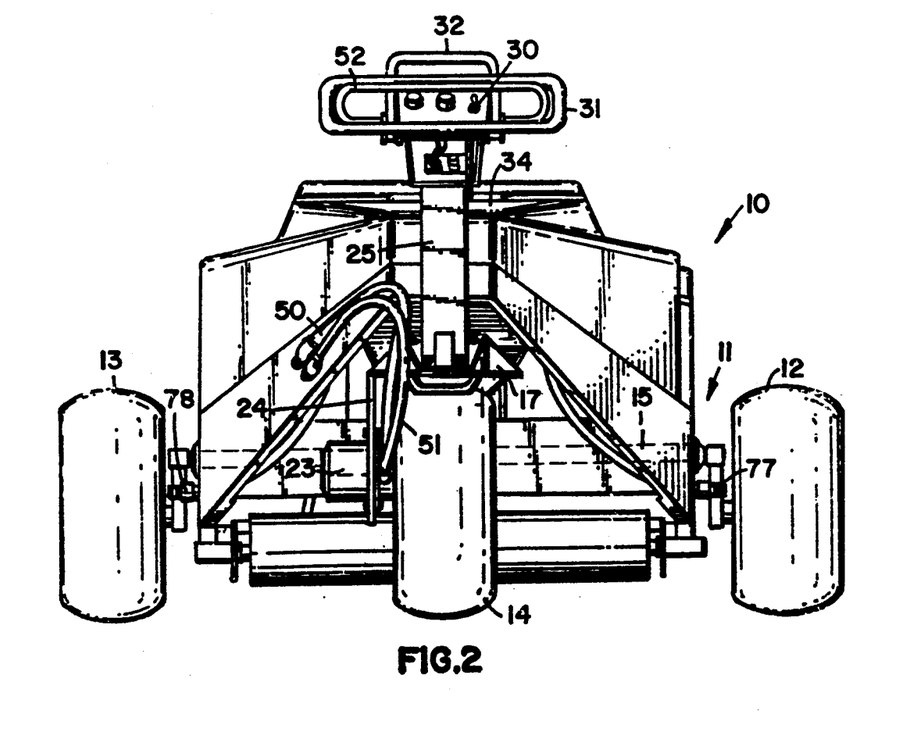
FIG. 2 is a rear elevation view of the cultivator shown in FIG. 1.
Figure 3:
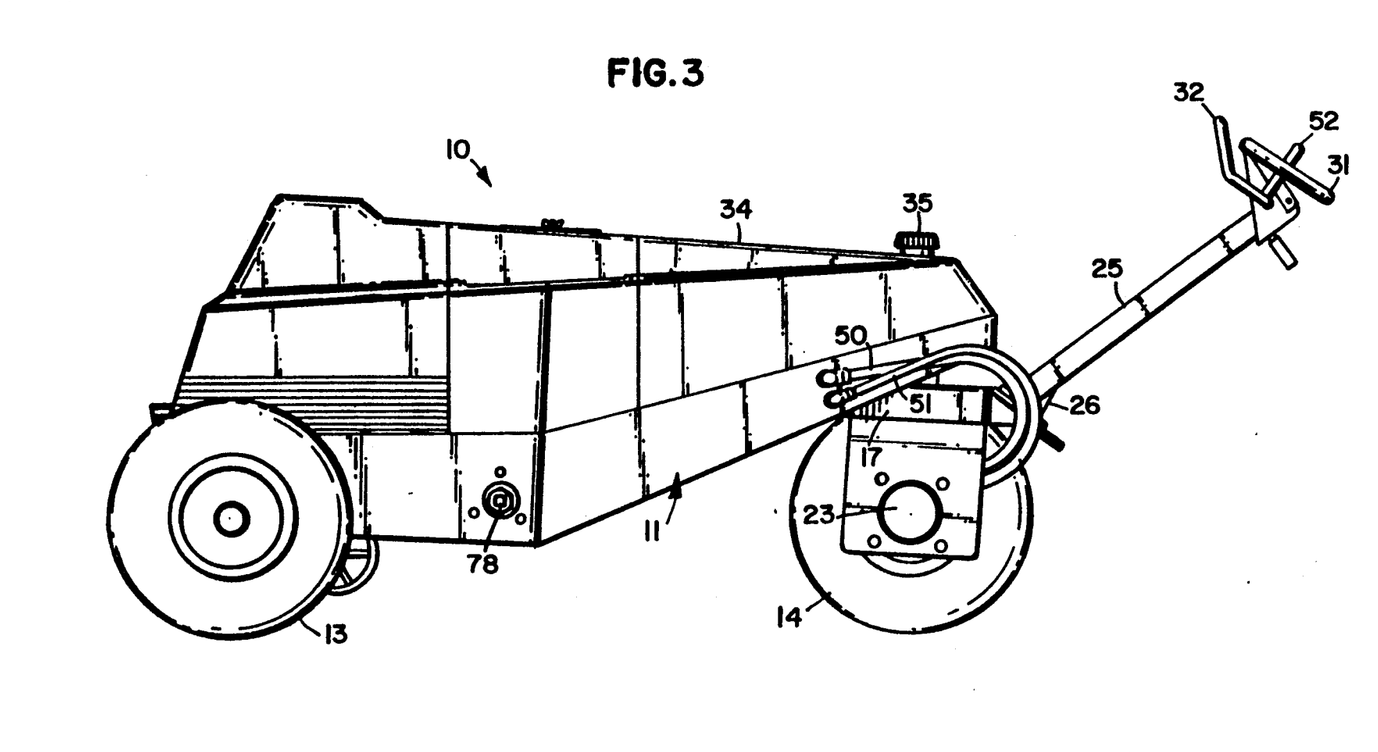
FIG. 3 is a left elevation view of the cultivator shown in FIG. 1.
Figure 4:
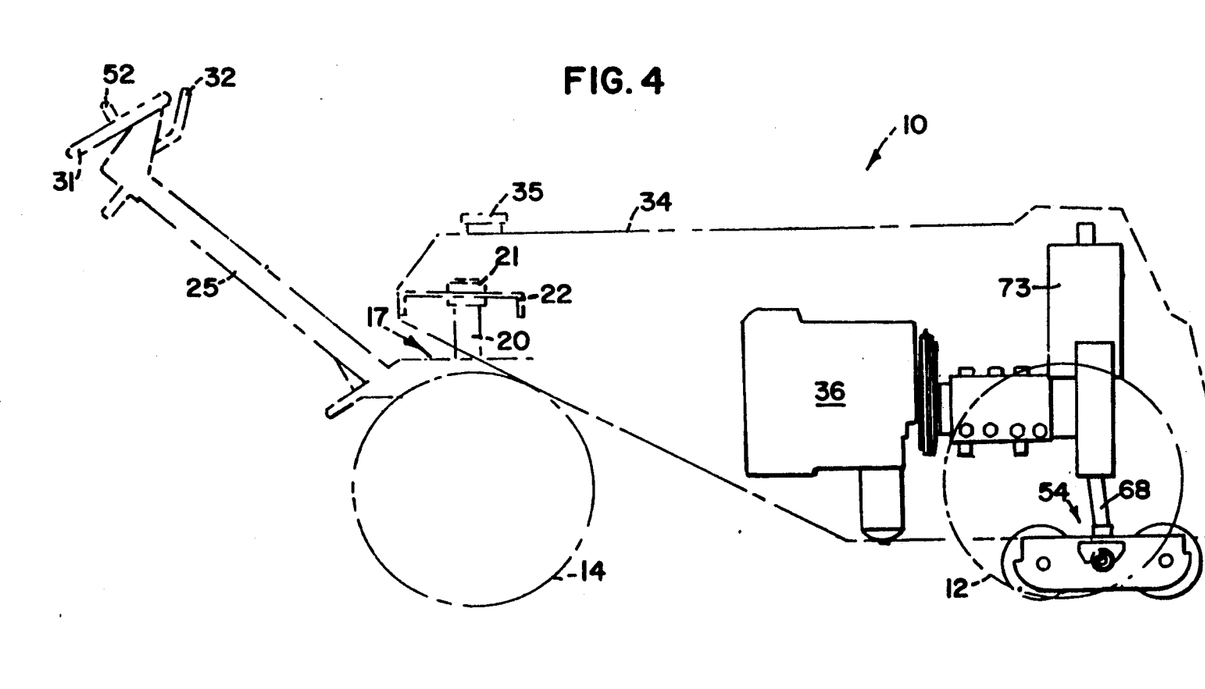
FIG. 4 is a right side elevation view of the cultivator shown in FIG. 1, with the outline of the cultivator being shown in phantom and showing some inner components thereof.
Figure 5:
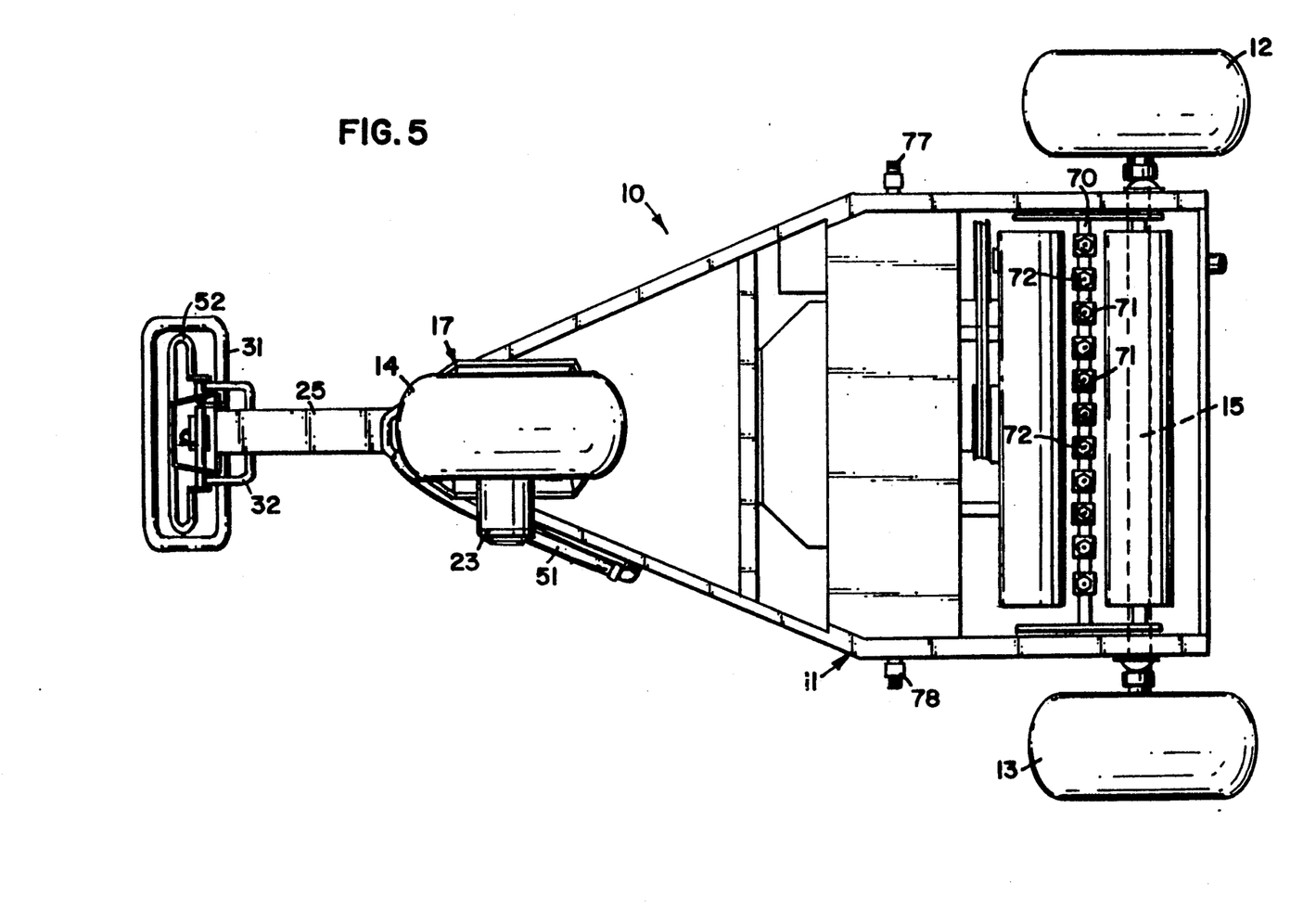
FIG. 5 is a bottom plan view of the cultivator shown in FIG. 1.

The cultivator 10 includes a frame generally designated at 11. The cultivator 10 has two modes of operation, a transport mode and a cultivation mode. In order to permit movement of the cultivator 10 during the transport mode of operation, the frame 11 is supported by front wheels 12, and 13, and a steerable rear wheel 14 as shown in FIGS. 1 and 2. The two front wheels 12 and 13 are connected to the frame 11 by means of a torsion axle 15 (FIG. 5). As shown in FIGS. 2, 3 and 4, the steerable rear wheel 14 is connected to the frame 11 by means of a steering mount assembly 17. The steering mount assembly 17 has a dome shaped top which partially covers the top of the tire 14 and from which a shaft 20 (FIG. 4) extends. One end of shaft 20 is rigidly connected to the dome shaped top of the steering mount assembly while the other end of shaft 20 is rotatably mounted by means of a bearing 21. Bearing 21 is mounted in a plate 22 which in turn is rigidly connected to the frame 11.

As will be described in more detail later, the cultivator 10 is driven by means of an hydraulic motor 23 connected to an axle of the steering wheel 14. Hydraulic motor 23 is supported by means of a bracket 24 (FIG. 2) which is rigidly attached to the steering mount assembly 17.

One end of an elongated steering fork, or tiller, 25 is rigidly connected to the top of the steering mount assembly 17 by means of a bracket 26. Preferably, the steering tiller 25 is hollow to accommodate control wires and cables, to be more fully described hereafter.

Figure 6:
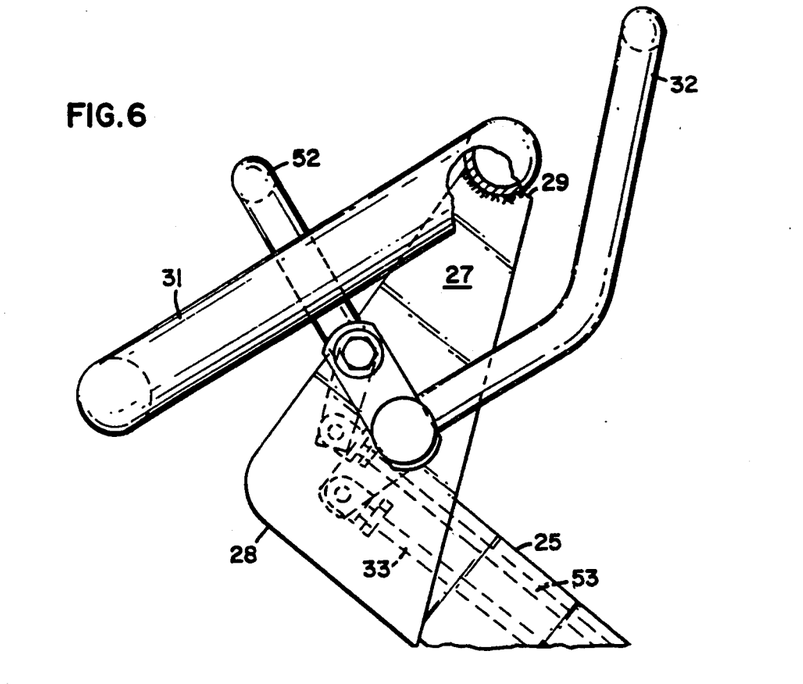
FIG. 6 is a right side elevation view of a tiller control section of the cultivator shown in FIG. 1.

A handle support bracket 27 is rigidly connected to the other end of the steering tiller 25 by suitable means such as welding. As best shown in FIG. 6, the handle bracket 27 has a bottom edge 28 and a top edge 29. The top edge 29 of the handle bracket 27 has an elongated slot formed therein in which is rigidly attached, as by welding, one side of a rectangular handle 31 which may be made of any suitable material such as tubing having a circular cross section. The other side of rectangular handle 31 is cantilevered from the top edge 29 of handle bracket 27.

A parking brake handle 32 is pivotally mounted on the handle support bracket 27 and is connected by a suitable linkage, such as cable 33, to a parking brake (not shown) operably connected to the powered steering wheel 14. Braking may be accomplished by a downward (as viewed in FIG. 5) movement of the parking brake handle 32.

Figure 7:
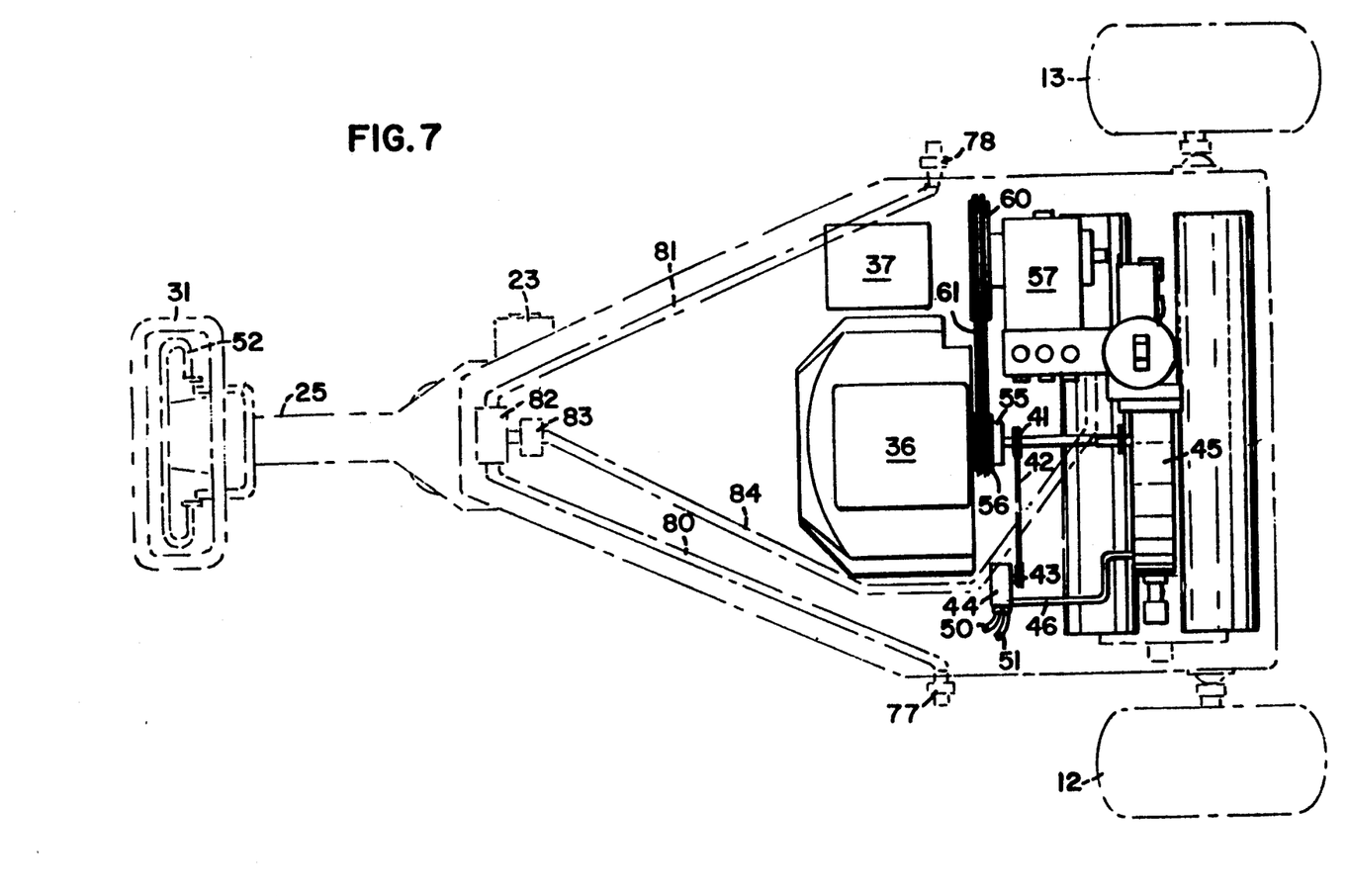
FIG. 7 is a top plan view of the cultivator shown in FIG. 1 with portions thereof being shown in phantom, and showing some of the inner components.

A gas tank 34, having a fill cap 35, is positioned on frame 11, as shown in FIG. 1, and is connected thereto. Gasoline from gas tank 34 passes through a line (not shown) to a gasoline engine 36 (FIG. 7). The engine 36, which may be of any suitable type such as an Onan 24 hp, is mounted by any suitable means (not shown) to the frame 11. A battery 37 and engine operating controls, located on a control panel 38, are also mounted on frame 11 and connected to the engine 36 by any suitable means well known in the art.

Figure 10:
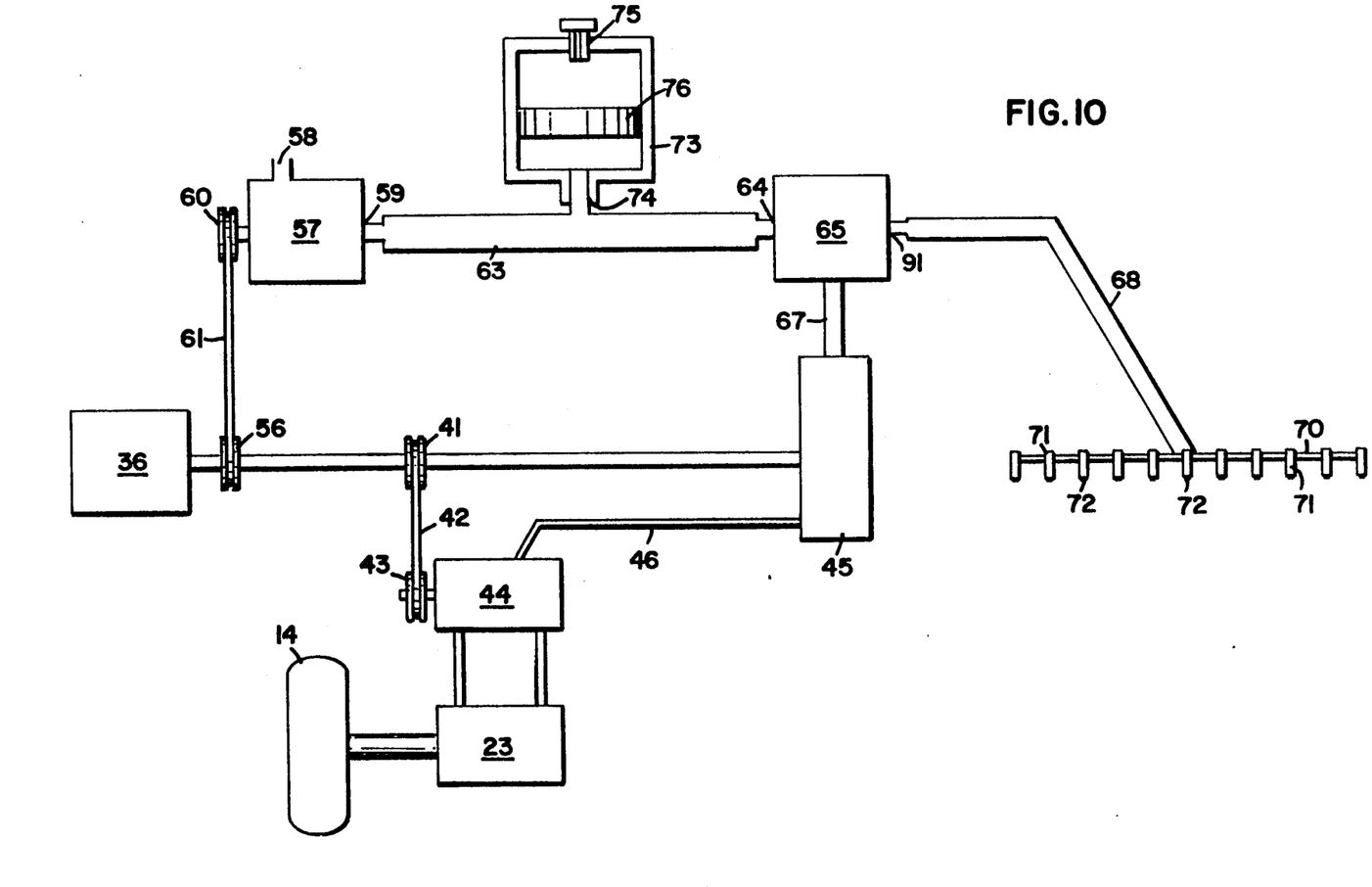
FIG. 10 is a schematic representation of the cultivator shown in FIG. 1

As best shown in FIGS. 7 and 10, a first engine pulley 41 is connected to an output shaft of the engine 36 and is connected by means of a belt 42 to a pump pulley 43 which is mounted on a shaft of an hydrostatic pump 44. Pulleys 41 and 43 are constantly turning as long as engine 36 is running. Oil from a gear box 45 is fed through an inlet tube 46 and acts as a source of oil for the pump 44. The hydrostatic pump 44 may be of any type well known in the art such as a Hawk HC600 pump from Hotsy Corp. of Colorado Springs, Colo.; a Cat Model No. 3507 from Cat Pumps Corporation, P.O. Box 885, Minneapolis, Minn. 55440; or a Giant Model No. LP 501W from Giant Products, 3156 Bellevue Road, Toledo, Ohio 43606.

The direction and speed of operation of the hydrostatic pump 44, and hence the direction and speed of operation of the cultivator 10, is controlled through the operation of motor control 1 lever 47 (FIG. 1). Depending upon the direction which the motor control lever is moved from the vertical, the hydrostatic pump 44 will pump oil out of either an output line 50 or an output line 51 to the hydraulic drive motor 23 connected to wheel 14, thereby driving the motor 23 either in forward or reverse. The speed at which the hydraulic drive motor 23 is driven is determined by how far the motor control lever is moved from the vertical in either a forward or backward movement. A throttle control bar 52 is pivotally mounted to the handle support bracket 27. Rotational movement of the throttle control bar forward moves the cable 53 in a first direction and rotational movement backward causes movement of the cable 53 in an opposite second direction such linkage being well known in the art. The cable 53 is connected so as to cause hydrostatic pump 44 to operate the hydraulic motor 23, and hence wheel 14, in a forward or reverse direction depending upon the direction of movement of the throttle control bar 52.

Any suitable linkage between the throttle control bar and the motor control lever and the hydrostatic pump 44 may be utilized to control the direction and speed of hydraulic motor 23. One such linkage is described in detail in a copending patent application of Dean A. Podevels et al titled METHOD AND APPARATUS FOR SOIL CULTIVATION BY HIGH PRESSURE FLUID INJECTION and filed concurrently with the present application.

Figure 8:
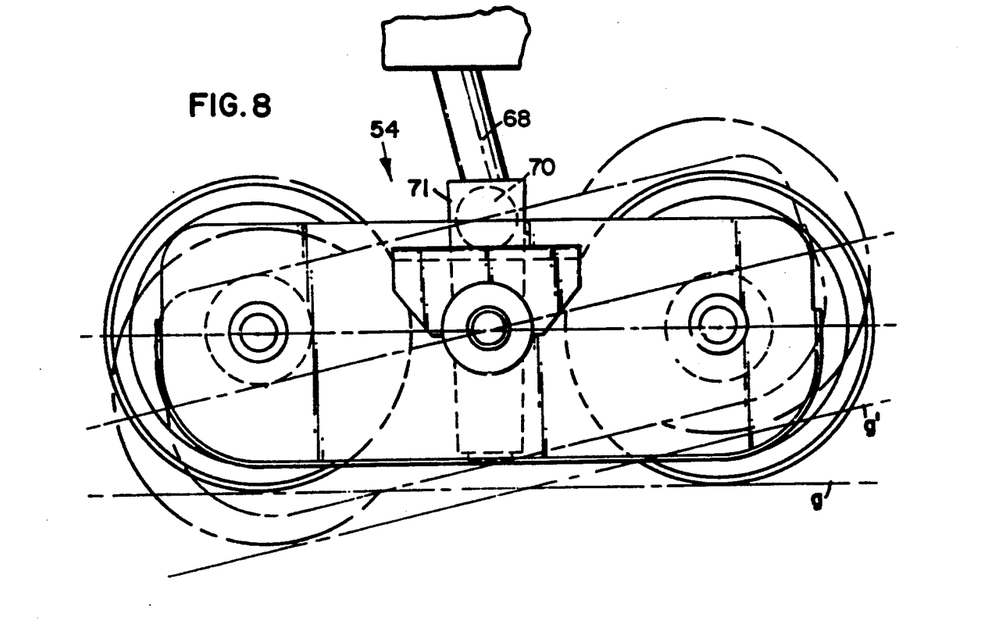
FIG. 8 is an enlarged side elevation view of the rollers and nozzles of the cultivator shown in FIG. 1.

As indicated previously, the cultivator 10 has two modes of operation, a transport mode and a cultivation mode. When used in the cultivation mode, the front wheels 12 and 13 are raised and the cultivator 10 is supported by a roller assembly 54 best shown in FIGS. 8 and 9.

A detailed description of a mechanism for lifting the front wheels 12 and 13 during the cultivation mode, as well as a detailed description of the roller assembly 54, is contained in the previously identified Podevels et al patent application and will not be repeated here.

Referring to FIGS. 4, 5, 7, 9, 10 and 11, a clutch 55 is connected to the output shaft of the engine 36 and engages and disengages a second engine pulley 56.

A water pump 57 having a low pressure inlet port 58 and a high pressure outlet port 59 is mounted on frame 11 and a water pump pulley 60 on a drive shaft of the water pump 57 and is driven by means of a belt 61 which engages both the water pump pulley 60 and the second engine pulley 56.

Figure 9:
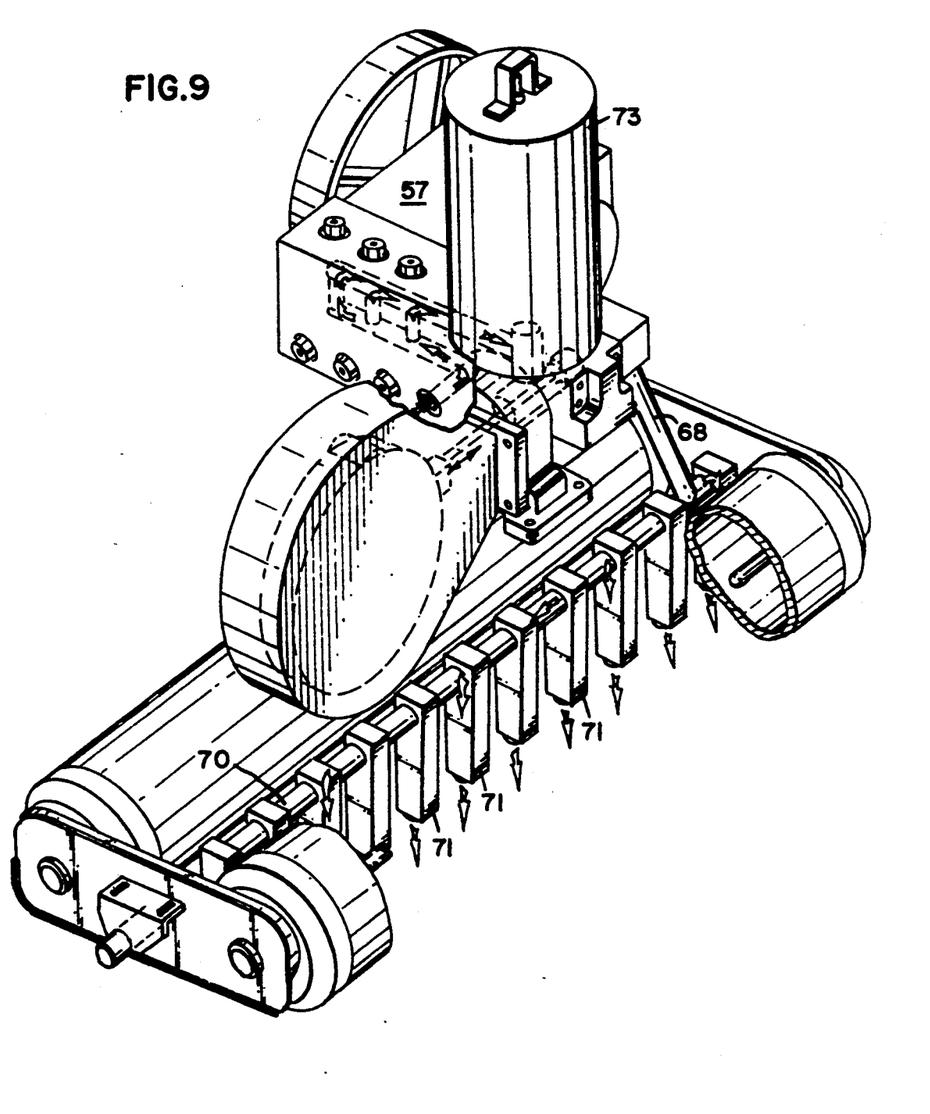
FIG. 9 is a perspective view of a portion of the water system of the cultivator shown in FIG. 1.

A tube, or other suitable fluid conduit, 63 is connected between the output port 59 of pump 57 and an input port 64 of a metering valve 65. Metering valve 65 also has an output port 66 and a valve stem 67 which opens or closes the fluid passage from the input to output ports 64 and 66 of valve 65. A discharge tube 68 is connected to the output port 66 of metering valve 65. The discharge tube 68 is preferably of metal and is of sufficient structural strength to support a nozzle bar 70. The bar 70 may also be supported at other points along its length, if necessary. A plurality of nozzles 71 have input ports which are in fluid communication with the nozzle bar 70. As best shown in FIGS. 5 and 9, there are 11 nozzles 71 spaced apart along the nozzle bar 70 which in turn is mounted between the rollers of roller assembly 54. Each nozzle 71 has an output port 72.

An accumulator 73, best shown in FIG. 10, has its input 74 in fluid engagement with the fluid conduit 63. Accumulator 73 has a charge, or fill, inlet 75 and a piston, or plunger, 76. The accumulator may be either gas or spring operated, and may be of either the piston or bladder type. One suitable accumulator used in the present invention is a 4 inch I.D. nitrogen charged Accumulator A4J005C149J from Parker Hannifin Corp. of Hillsborgh, N.C. Another such accumulator is a Greer-Bladder Type Model #50A ¼ WS, Part No. 842310 from Greer Hydraulics, 6500 East Slauson Avenue, City of Commerce, Calif. 90040.

As shown in FIGS. 5 and 7, a right side hose fitting 77 is mounted in the right side of frame 11 while a left side hose fitting 78 is mounted in the left side. Hoses 80 and 81 are connected at their first ends to the hose fittings 77 and 78 respectively and at their second ends to a T connector 82. A water strainer 83 is connected between the output of the T connector 82 and the inlet port 58 of the water pump 57 by means of a hose 84.

Figure 11:
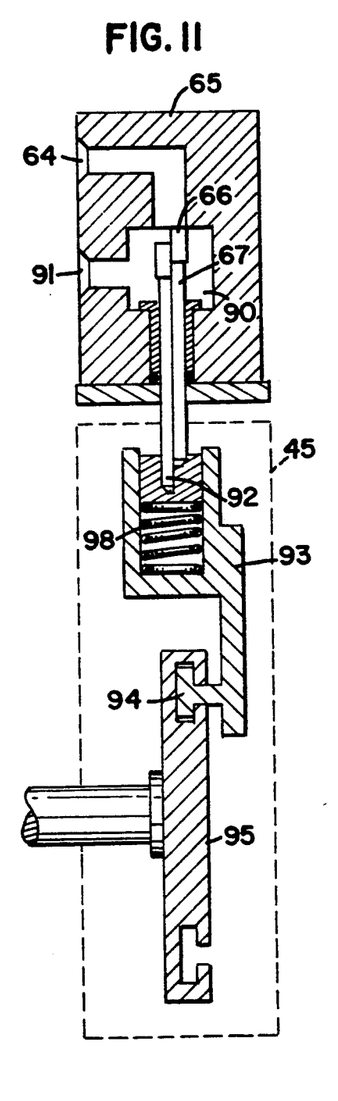
FIG. 11 is a sectional view of a side elevation of a metering valve and cam suitable for use in the present invention.
Figure 12:
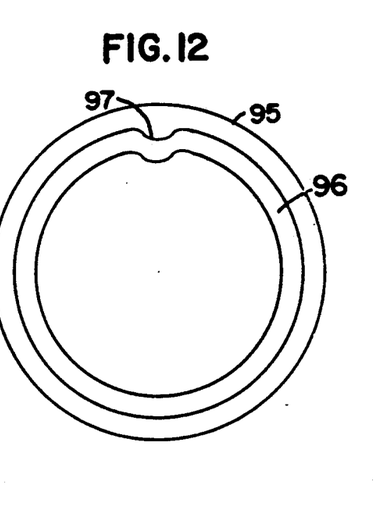
FIG. 12 is a sectional vertical plan view of the cam shown in FIG. 10.

FIG. 11 shows one embodiment utilized to meter and control the timing of the injections of high pressure liquid through the turf into the soil. The fluid conduit 63 was connected to the input port 64 of the metering valve 65 which in turn is in fluid engagement with the output port 66, i.e. the valve seat, of valve 65. The valve stem 67, shown in a split relationship indicating both the open and closed position, is normally closed preventing the fluid from fluid conduit 63 from entering a valve chamber 90 and exiting an output connection 91. As shown in 11, the valve stem 67 is connected to a plunger 92 of a slide mechanism 93. A compression spring 98 housed within mechanism 93 biases plunger 92 and stem 67 toward valve 65. Slide mechanism 93 is connected to the frame 11 (connection not shown) so that it can move in a vertical direction only (as shown in FIG. 11). Slide mechanism 93 has a cam follower 94 which rides in a cam 95, the track 96 of which is shown in vertical plan view in FIG. 12. As shown, the cam track 96 has a cam follower actuator 97 which moves the slide mechanism in a downward direction (as shown in FIG. 11) with each revolution of the cam 95. The downward movement of the slide mechanism 93 pulls the valve stem 67 away from the output port 66 and allows the high pressure liquid from the fluid conduit 63 to enter the valve chamber 90 and exit out of the output connection 91 into the discharge tube 68 and ultimately through the output ports 72 of the nozzles 71. While only one cam follower actuator 97 is shown in FIG. 11, is will be understood by those skilled in the art the several such cam follower actuators can be included in the cam track 96 to provide any desired timing of the metering valve 65 at any rotational speed consistent with value opening and closing times of from 0.007 to 0.065 seconds. In a specific test of the present invention the system pressure utilized was 5000 psi, and the input port 64 of valve 65 had a diameter of 0.50 inches. In this application the pressure against the valve stem 67 was approximately 1000 pounds. In this specific application a spring pressure of approximately 1250 pounds was found to provide a sufficient holding pressure prior to activation of the valve opening by the cam.

Another accumulator and metering valve arrangement is disclosed in the copending Podevels et al patent application previously described, and is incorporated by reference herein.

In operation, the engine 36 of the subsoil cultivator 10 is started from controls which are located on the control panel 38 located on the right side of frame 11 as shown in FIG. 1. These controls are described in the copending Podevels et al application previously discussed and hence will not be repeated here. It has been found that it is preferable to have a start and stop button on the support bracket 27 as well as the toggle switch 30 for raising and lowering the rear wheels. By locating the controls in such a position, it is possible for an operator to operate the apparatus 10 from one position. Operation of the present invention can be understood from a consideration schematic representation shown in FIG. 10. When the engine 36 is operating, the hydrostatic pump 44 is driven by means of the pulleys 41 and 43 and belt 42. The pump 44 is always driven as there is no clutch associated with the pump 44. If the pump 44 is stroked in a first direction, the oil will flow out of the output line 50 to the hydraulic drive motor 23, causing the steerable drive wheel 14 to rotate and the cultivator 10 to go in a first direction. If the pump 44 is stroked in the other direction, oil will flow through output line 51 to the hydraulic motor 23 and the cultivator 10 will be driven in the opposite direction.

Engine 36 drives the water pump 57 through the engine pulley 56, belt 57, and pump pulley 60. Low pressure water if fed to the inlet port 58 of the water pump 57 which then pumps the water through the fluid conduit 63 to the inlet port 64 of the metering valve 65. Since valve 65 in normally closed through the operation of the valve stem 67, the operation of pump 57 builds up a high pressure water in the fluid conduit 63. If nothing were done to control this pressure buildup the system would rupture or relief valves would be blown. The accumulator 73 provides this control. The accumulator 73 shown in FIG. 10 is a gas charged type which has previously been charged with nitrogen, through the charge input 75, to a preset pressure. As the pump 57 builds up pressure in the closed fluid conduit 63 that exceeds the preset pressure of the accumulator, the pressurized water flows through the inlet port 74 of accumulator 73 and engages the piston 74 which is free to move within the accumulator. Continued pumping of water into fluid conduit 63 moves the accumulator piston against the nitrogen charge thus building up the pressure within the accumulator.

It should be understood that suitable pressure relief valves (not shown) may be incorporated in the fluid conduit 63 and the discharge tube 68 in order to protect against undue buildup of system pressure due to valve malfunction, clogging or other reasons.

It is an important aspect of the present invention that the accumulator be charged to a pressure sufficient to allow the accumulator to store the water output capacity of the pump during the time that the metering valve 65 is closed. By water output capacity of the pump is meant the volume of liquid pumped at pump pressure. In other words, the accumulator should be charged such that it will store the volume of liquid pumped during the time that the metering valve 65 is closed at an accumulator pressure equal to the desired output pressure at the output ports 72 of the nozzles 71. It has been found that generally the accumulator should be charged to about one half the nozzle output pressure. Another purpose of the accumulator 73 is to smooth the flow of liquid through the system when the metering valve 65 is open.

Engine 36 drives a cam 95 which acts on the valve stem 67 of metering valve 65 and periodically opens the valve. When valve 65 is open the pressurized liquid flows from the accumulator 73 through valve 65, discharge tube 68, nozzle bar 70, nozzles 71 and out the nozzle output ports 72. These slugs, or jets, of high pressure liquid are driven to a substantial depth through the turf and into the soil. The high pressure of the liquid causes not only a penetration of the soil but also a lateral dispersion of the liquid within the soil.

In accordance with the present invention the spacing of adjacent nozzles 71 on the nozzle bar 70; the height of the nozzle outputs above the surface of the turf; the speed movement of the cultivator 10 over the turf to be treated; and the timing of the periodic opening and closing of the metering valve 65; as well as the operating pressure of the system are correlated so as to create a pattern of liquid injections such that the lateral dispersion of water from adjacent injections coact to lift and fracture the soil and thus reduce the soil's general density.

It has been determined that, at a system pressure of approximately 5000 psi, the distance of the output ports 72 of the nozzles 71 from the surface of the turf can be varied from 0.50 to 5 inches with the preferable spacing being between 0.50 and 1.50 inches. At the higher distance, i.e. 3 to 5 inches, it has been found that the jets of water will entrain air and will carry this entrained air deep within the soil. However, it has also been found that injection of high pressure liquid from these higher elevations has a tendency to disrupt the surface of the turf. For this reason spacing of the output ports of the nozzles at the higher elevation should not be utilized on surfaces, such as a golf course green, where the disruption may present problems, such as the prevention of immediate play after cultivation. When I refer to disruption of the turf with the nozzles at a higher elevation it should be understood that I am comparing the disruption with the action of the cultivator when the nozzles are at a lower elevation and not with the disruption created to the surface of the turf being treated by the hollow or solid tine core aerators. The surface disruption created by the hollow and solid tine aerators is always more severe than experienced with the present invention.

It has also been determined that the accumulated area of the output ports 72 of the nozzles 71 has a direct relationship to the area of the output port 66 of the metering valve 65. It has been found that the area of the outlet port 66 should be from 6–14 and preferably 8–10 times the total accumulated area of the output ports 72 of the nozzles 71. It should be understood that when referring to the output port of the valve 65 I am referring to the cross-sectional area of the valve seat within the valve. In addition, it is necessary that the input port 64 as well as the associated system tubing be consistent with this relationship, i.e. the cross sectional areas of these systems components must be equal to, and preferably larger, than the cross-sectional area of the output port 66.

I have further determined that the injection pressure from the output ports 72 of the nozzles 71 should be equal to and preferably greater than 2300 psi with a pressure of approximately 5000 psi being preferred.

In one test application of the present invention a system pressure of 5000 psi was utilized. From nine to thirteen nozzles 71 were utilized on the nozzle bar 70 and the diameter of the output ports 72 of the nozzles was 0.0465 inches. The diameter of the output port 66 of the metering valve 65 was 0.50 inches. The charge of the accumulator 73 was 2500 psi and the capacity of the accumulator was approximately one quart. The cycling speed of the metering valve, i.e., the opening to closing time, was from 0.015 to 0.065 seconds. The diameter of the output ports 72 of each of the nozzles 71 was 0.0465 inches. System tubing and connections were consistent with proper liquid injection as explained above. The test machine had a variable speed range from 0 to 3 ½ miles per hour. The cam speed was set to provide three injections per second. The nozzle bar was replaceable with transverse nozzle spacing of 3 inches, 4 inches, 5 inches or any multiples thereof. This nozzle bar arrangement permitted tests to be conducted with transverse liquid injections spaced 3, 4, 5, 6, 8, 9, 10, etc. apart, with a forward spacing of injection varying from 0 to approximately 21 inches. Our tests indicate that the most promising reduction in soil density occurs with an approximate 2 to 6 inch square or rectangular injection pattern with the 5000 psi system pressure. This spacing pattern is not absolute. It must be understood that the most important point is to maintain a jet injection pattern which, consistent with the system pressure, will provide a lateral dispersion of the incompressible liquid so as to sufficiently fracture the soil.

In severely compacted areas, the subsurface cultivator of the present invention can achieve very deep turf penetration through the repeated application of slugs of liquid into the same hole in order to improve the drainage. Turf penetration of thirty inches or more have been obtained using the present invention. Deep penetration of highly compacted turf can also be obtained by using fewer nozzles with larger diameter output ports consistent with the system operating pressure and flow.

While I specifically described the use of water in practicing my invention, it will be understood by those skilled in the art that any substantially incompressible liquid, such as incompressible liquid fertilizers or weed killers, may be used. The important factor is that the liquid have sufficient incompressibility so that the injection pressure and jet spacing provides the turf penetration and lateral dispersion necessary to accomplish the lifting and fracturing of the soil to significantly reduce the general soil density.

Further, while I describe a single row of generally transversely spaced nozzles, it will be understood by those skilled in the art that multiple rows of transversely spaced nozzles may also be employed. By controlling the timing of slug injection with the speed of the frame movement over the turf to be treated, predetermined sections of turf may be treated during any specific injection sequence.

Finally, while in the embodiment shown the pressurized source of incompressible liquid is carried on the frame, it should be understood that an external source of high pressure liquid may be utilized to feed fluid conduit 63 thus eliminating the need to carry water pump on the frame.

Other modifications of my invention will be apparent to those skilled in the art in light of the foregoing description. .This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

I claim:
1. A turf treating method comprising:
   (a) creating a source of relatively high pressure incompressible liquid,
   (b) periodically injecting jets of said incompressible liquid from above said turf through the turf into soil below the turf at a pressure that will cause a lateral dispersion of the liquid within said soil,
   (c) moving said source of incompressible liquid over the surface of said turf in a pattern such that the lateral dispersion from adjacent jets coact with one another to lift and fracture the soil and reduce the general soil density.

2. The turf treating method of claim 1, further comprising injecting said periodically injecting jets through a plurality of nozzles.

3. The turf treating method of claim 1, further comprising simultaneously injecting said periodically injecting jets of said incompressible liquid.

4. A turf treating method comprising:
   (a) creating a source of relatively high pressure incompressible liquid,
   (b) periodically repeatably injecting jets of said incompressible liquid from above said turf through the turf into soil below the turf at a pressure that will cause a lateral dispersion of the liquid within said soil,
   (c) moving said source of incompressible liquid over the surface of said turf to a new turf position and again repeatably injecting jets of said incompressible liquid from above said turf through the turf into soil below the turf at a pressure that will cause a lateral dispersion of the liquid within said soil,
   (d) continuing movement of said source of incompressible liquid over said turf in a pattern such that the lateral dispersion from adjacent jets coact with one another to lift and fracture the soil and reduce the general soil density.

5. A turf treating method as described in claim 4 wherein said jets flow through a nozzle and said nozzle is spaced from 0.50 to 5.0 inches above the turf to be treated.

6. A turf treated method as described in claim 4 wherein said jets flow through a nozzle and said nozzle spaced from 0.50 to 1.5 inches above the turf to be treated.

* * * * *